United States Patent [19]

Jensen

[11] 4,336,854
[45] Jun. 29, 1982

[54] WEIGHING SYSTEM

[76] Inventor: William F. Jensen, 7 Iroquois Dr., Clinton, Conn. 06413

[21] Appl. No.: 201,712

[22] Filed: Oct. 29, 1980

Related U.S. Application Data

[63] Continuation-in-part of Ser. No. 54,838, Jul. 5, 1979, abandoned.

[51] Int. Cl.³ ............................................... G01G 7/02
[52] U.S. Cl. ................................. 177/210 R; 177/212; 177/DIG. 5; 338/32 H
[58] Field of Search ............... 177/210 EM, 210 FP, 177/210 R, 212, DIG. 5; 324/251, 117 H, 208; 364/573, 567; 338/32 H

[56] References Cited

U.S. PATENT DOCUMENTS

| | | | |
|---|---|---|---|
| 3,195,043 | 7/1965 | Burig | 324/251 X |
| 3,550,430 | 12/1970 | Janssen | 177/212 X |
| 3,604,525 | 9/1971 | Blethen | 177/212 X |
| 3,955,638 | 5/1976 | Wasko | 177/212 |
| 4,039,036 | 8/1977 | Baumgartner | 177/212 |
| 4,062,417 | 12/1977 | Kunz | 177/212 |
| 4,150,730 | 4/1979 | Knothe | 177/212 |

FOREIGN PATENT DOCUMENTS 527598 8/1977 U.S.S.R. ........................... 177/212

*Primary Examiner*—Joseph W. Hartary
*Attorney, Agent, or Firm*—Costas, Montgomery & Dorman

[57] ABSTRACT

A weighing device using an electromagnet to attract a load bearing member where the balancing force is sensed using a Hall effect device to sense the force of the magnetic field. Means are provided to produce a signal which is linearly proportional to the weight of the object being weighed.

10 Claims, 4 Drawing Figures

WEIGHING SYSTEM

BACKGROUND OF THE INVENTION

This application is a continuation-in-part of application Ser. No. 54,838 filed July 5, 1979 now abandoned.

This invention relates to weighing devices and more particularly relates to weighing devices of the type referred to as electromagnetic compensated.

In weighing devices of the type to which this invention relates, it has been the practice to return a load carrying member from a displaced position to a datum position by an electromagnetically produced force applied to the load carrying member, the magnitude of the electric current giving rise to the restoring force being taken as a measure of the weight of the load.

Known electromagnetic weighing balances include a movable support system for a mass to be weighed, the support system including an electromagnetic balance coil disposed in the field of a permanent magnet. Sensing means are provided for developing a controlled signal representative of any displacement of the support system from a datum position occurring when a mass is supported on the system. A current source controlled by a control signal provides the balance coil with current such that by the interaction of the current in the coil with the magnetic field in which the coil is included, a force is developed which counterbalances the mass. The magnitude of the current is thus a measure of the weight of the mass.

When the current to the electromagnet is used as a measure of the restoring force, then the range of the weighing device is limited since the relationship of restoring force or magnetic field to the energizing current (B/H) is only linear over a small range.

The use of an air core coil as a compensating coil fed with direct current has also been produced. However, this requires a far greater value of current to develop the same magnetic field (B) as a coil with a magnetic core and the same number of turns.

In recognition of this deficiency and in order to take advantage of the linear B/H caracteristics of the air core coil and still produce a necessary compensating force, a permanent magnet capable of generating a large interacting field has been used. In this way, the compensating physical force between the interacting magnetic fields could be controlled by the current in the compensating coil which would be linearly related to the compensating force. Measurement of the coil current would therefore be a linear measure of the compensating force. The compensating force developed in such a device is proportional to the number of turns of the coil, the current in the coil, and the strength of the magnetic field of the permanent magnet. There are many disadvantages to this type of compensating device in that a magnetic field is permanently associated with the device whether or not it is in use; a permanent magnet field will diminish with age and vary with ambient temperature; heat build-up in the compensating coil influences the strength of the permanent magnet field; stronger permanent magnet fields required to extend the compensating force capacity of the device are influenced by ferro-magnetic materials in the vicinity of the device; error resulting from the addition or subtraction of the field coil magnetic field and the permanent magnet field increase quadratically with coil current; and spurious signals can be induced in the field coil.

Accordingly, the present invention provides an electromagnetically compensating weighing device utilizing an electromagnetic to develop a single field and resulting compensating force as a result of the interaction of the field of the electromagnet with ferro-magnetic material attached to the load carrying device of the scale, where the magnetic field is sensed directly. Therefore, the B/H characteristic of the electromagnet which is non-linear because of the hysteresis effect does not introduce any error.

SUMMARY OF THE INVENTION

Briefly stated, the invention, in one form thereof, comprises an electromagnet which supplies a compensating force to return a displaceable load bearing member to a null or datum position, means for sensing when the null position is reached, and a means for sensing the magnetic field due to the electromagnet and generating a signal linearly proportional thereto. As the signal indicative of the electromagnetic force increases to bring the displaced load carrying member back toward a null position, a signal is sensed and stored and then utilized to provide a readout of the return force required to move the load bearing member and therefore the weight of the load.

An object of this invention is to provide a new and improved weighing device of the electromagnetically compensated type.

The features of the invention which are believed to be novel are particularly pointed out and distinctly claimed in the concluding portion of this specification. The invention, however, both as to its operation and organization together with further objects and advantages thereof may best be appreciated by reference to the following detailed description taken in conjunction with the drawings.

DETAILED DESCRIPTION

Figure 2:
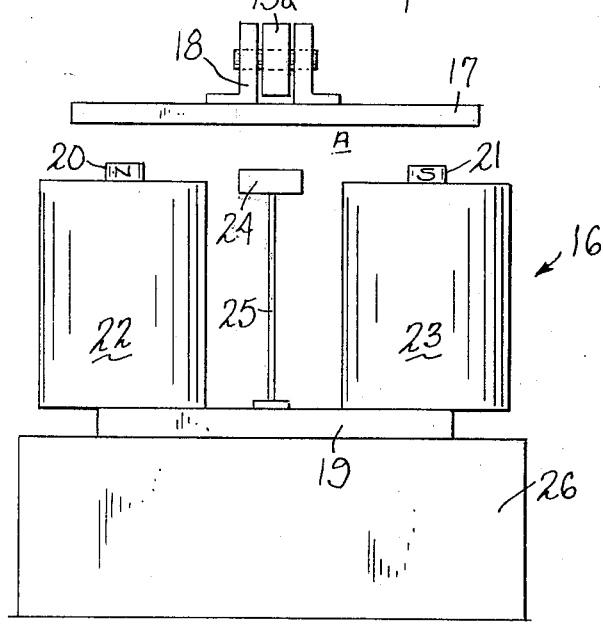
FIG. 2 is a view seen in the plane of lines 2—2 of FIG. 1.

The invention may be embodied in a conventional beam balance 10 which comprises a base member 11 including a member 12 pivotally mounting a non-magnetic balance beam 13. Balance beam 13 carries adjacent one end thereof a load-receiving member 14 which may have an enlarged load receiving pan or tray 15. A fine mechanical adjustment in the form of a weight 14a may be threadably received in the end of beam 13. As shown in FIG. 2, an electromagnet 16 is arranged to exert a return force on a low remanence magnetic member 17 mounted to a non-magnetic support 18 on the non-load end of beam 13. The electromagnet as shown may take the form of a U-shaped magnetic member 19 having legs 20 and 21 with reversely wound coils 22 and 23, respectively, thereon. When energized, the electromagnet will exert a force on magnetic member 17 through the air gap A. Disposed in the air gap between north and south poles formed by the ends of legs 20 and 21 is a magnetic field sensing device 24 which may take the form of a Hall effect sensor, such as models TL173I or TL173C available from Texas Instruments, Incorporated of Dallas, Texas. Such sensors provide an output voltage which is a function of the sensed magnetic field. The devices named include a Hall effect element as the primary sensor along with a voltage reference and an amplifier. The sensor 24 is disposed in the air gap A and will sense the strength of the magnetic field between the N and S poles. Sensor 24 may be mounted to a non-magnetic support 25 carried by a non-magnetic sub-base 26 which also supports electromagnet 16.

Figure 1:
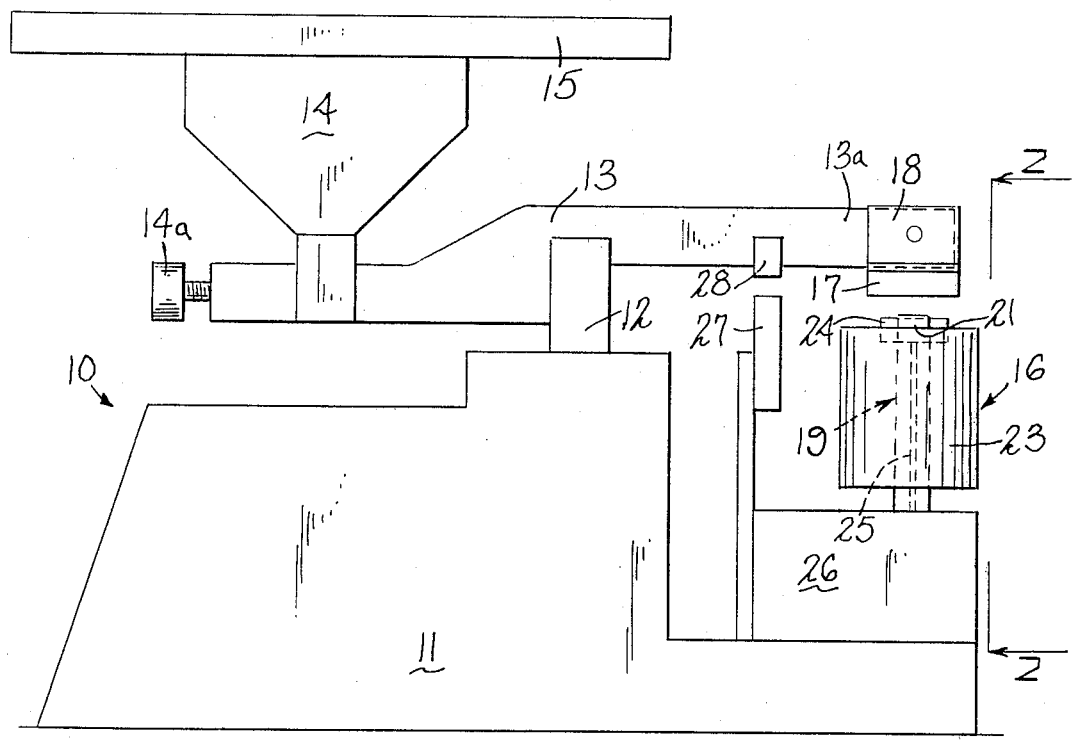
FIG. 1 is an elevation of a beam balance in which the invention may be embodied.

With this arrangement, the electromagnet 16 may be energized to attract and return end 13a of beam 13 when tray 15 is loaded. Means are provided to sense when the electromagnet field has overcome the load and the beam commences to move. As shown in FIG. 1, such sensing means comprises a permanent magnet 27 and a Hall effect switch 28 carried on beam 13. The magnet and switch may be reversely arranged. Alternatively, the sensing means could be any device which would indicate movement to a null position.

Figure 3:
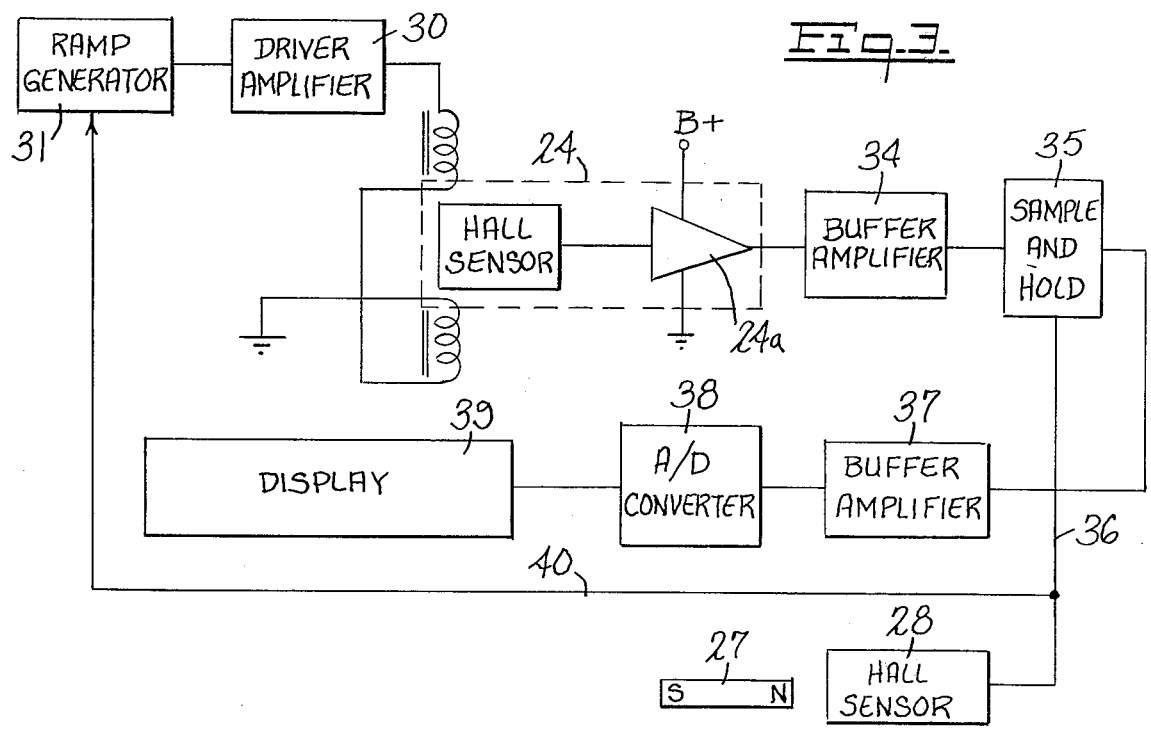
FIG. 3 is a block diagram of a control circuit embodying the invention.

Reference is now made to FIG. 3. The electromagnet is excited from a driver amplifier 30 by a ramp signal generator 31. The exciting voltage may rise at a rate of about twelve volts per second and should be substantially linear in view of the inductive load. The sensor 24 includes an amplifier 24a which supplies a signal indicative of the strength of the magnetic field to a buffer amplifier 34.

The amplified signal from sensor 24 is provided in the form of a voltage which is a function of the weight of the test object at equilibrium. While there is a substantial linear relationship between the voltage and the weight of the test object, the voltage may not be precisely linearly proportional to the weight over the applicable operative range of the weighing system. For systems where precision and range of weighing measurements dictate and where the output voltage $V_1$ of buffer amplifier 34 may be expressed as:

$$V_1 = K_o + K_1 W + K_2 W^2 + K_3 W^3$$

where W is the weight of the test object at equilibrium and $K_o$, $K_1$, $K_2$ and $K_3$ are constants, $K_2$ being a negative quantity, the system employs multiplier circuit 34a, summing amplifier 34b, and resistor R as described below. In many applications, components 34a, 34b, and R may be entirely omitted in which case the voltage output of buffer amplifier 34 is conducted directly to sample and hold circuit 35.

Voltage $V_1$ is conducted to multiplier circuit 34a. Multiplier circuit 34a produces an output voltage $V_2$ which is the square of the voltage input $V_1$. Voltage $V_2$ may be expressed as:

$$V_2 = V_1^2 = K_4 + K_5 W + K_6 W^2 + K_7 W^3$$

where $K_4$, $K_5$, $K_6$ and $K_7$ are constants, $K_6$ being a positive quantity.

Voltages $V_1$ and $V_2$ are the input voltages to summing amplifier 34b. Summing amplifier 34b produces an output voltage $V_3$ which is the sum of input voltage $V_1$ and $V_2$. Voltage $V_3$ may be expressed as:

$$V_3 = V_1 + V_2 = (K_o + K_4) + (K_1 + K_5)W + (K_2 + K_6)W^2 + (K_3 + K_7)W^3$$

The coefficients $K_2$ and $K_6$ which differ in sign, can be equated in terms of absolute value by means of resistor R, thus makine the quadratic term of $V_3$ equal to zero. The constant coefficient sum $K_o + K_4$ can be offset adjusted to zero within the circuit. The coefficient sum $K_3 + K_7$ is on the order of $10^{-9}$ and therefore essentially negligible relative to the linear term.

Therefore, voltage $V_3$ can be given by $(K_1 + K_5)W$ where $K_1$ and $K_5$ are constants. The output voltage of summing amplifier $V_3$ is thus a linear analog of the weight of the tested object.

The output of the summing amplifier 34b is applied to a sample and hold circuit 35. It should be noted that in systems where multiplier circuit 34a, summing amplifier 34b, and resistor R are not required, the output of buffer amplifier 34 is directly applied to a sample and hold circuit 35. Sample and hold circuit 35 receives a signal from Hall sensor switch 28 and its signal conditioning circuitry. When the sensor 28 is a predetermined distance from the permanent magnet 27, a hold signal is applied over line 36 to sample and hold circuit 35. This predetermined position is the null or datum position of beam 13 where the force of the magnetic field balances or overcomes the load on tray 15. This may be the point at which the armature or magnetic member just starts to move indicating that the field has balanced the load. At this point, the magnitude of the analog signal from Adding Amplifier 34b or buffer amplifier 34, as the case may be, is stored in the sample and hold circuit 35 and applied through a buffer amplifier 37 to the analog to digital converter circuit 38. The converter 38 is arranged to encode the analog signal for a seven-bar LED digital display 39. The analog digital converter and display are commercially available as a unit. At this point, the weight of the object of the load platform 15 is displayed, the weight being indicated by the force necessary to move the beam toward a balance or equilibrium condition. When the null or datum position is reached, a signal may be applied over line 40 to turn off or halt further increase in the output of ramp generator 31.

The invention may also be embodied in a straight movable tray or pan scale. A weighing device 50 as shown in FIG. 5 comprises a load-receiving tray or pan 51 supported on a non-magnetic shaft 52 which is slidable vertically in a guide 53 mounted to a support 54. Shaft 52 extends through a non-magnetic housing member 55 which supports an electromagnet assembly which may comprise a U-shaped magnetic member 56 having coils 58 and 59 mounted on the legs thereof. Further secured to shaft 52 is a magnetic member 61 adapted to be attracted by the electromagnet when it is energized. A position sensing switch 62 is carried on shaft 52 by a support 63. A permanent magnet 64 is carried by a member 65 on support 54. The switch 62 will sense proximity to magnet 64. The entire assembly normally rests on a non-magnetic base member 66.

In operation, when a load or test object is placed on pan 51, the electromagnet 56 is energized in the same manner as described in conjunction with FIGS. 2 and 3. A magnetic field acting on member 61 exerts a force attracting member 61 towards the north and south poles of the magnet. As the electromagnet assembly lifts the pan 51 together with shaft 52, switch 62 will sense a datum position. At this time, a signal will be applied to the sample and hold circuit 35 of FIG. 2, and the weight of the load on tray 51 will be indicated.

Figure 4:
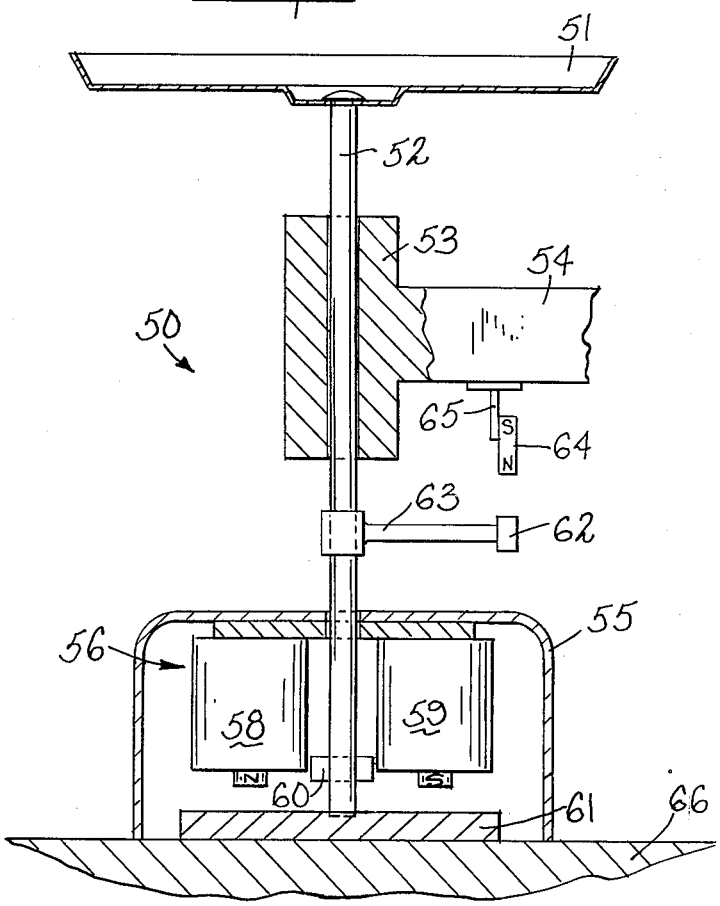
FIG. 4 is an elevation of another weighing device embodying the invention.

The control circuitry for the device of FIG. 4 is preferably the same as that shown in FIG. 3. This invention described above gives a directly proportional signal of magnetic field strength (force) over an increased range, which is independent of the non-linearities due to hysteresis. Moreover, in directly measuring restoring force (field strength) any errors to the temperature variations are eliminated.

It may thus be seen that the objects of the invention set forth as well as those made apparent from the foregoing description are efficiently attained. While preferred embodiments of the invention have been set forth for purposes of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. In a weighing system of the type where an electromagnet is excited to move a load bearing member toward a null position, the improvement comprising: means for exciting the electromagnet at a finitely increasing rate to produce a magnetic field acting to move said load bearing member, means for sensing when said load bearing member moves under the force of the magnetic field, means for measuring the strength of the magnetic field of said electromagnet and generating a signal indicative thereof, means responsive to said sensing means for sampling the generated signal, and means responsive to said sampling means for indicating the weight of a load on said load bearing means.

2. The system of claim 1 wherein the load bearing member is at one end of a balance beam, said electromagnet is disposed beneath the other end of the balance beam, and a member of magnetic material is carried on said other end of the balance beam, said magnetic member being attracted by said electromagnet when the zone of the magnetic field reaches a value sufficient to overcome a load on the load bearing member.

3. The system of claim 1 wherein the load bearing member is carried on a vertically moveable shaft, a member of magnetic material carried on said shaft, said electromagnet positioned above said magnetic member to attract said member when the force of the magnetic field reaches a value sufficient to overcome a load on the load bearing member.

4. The system of claim 3 where said sensing means senses movement of said shaft.

5. The system of claim 1 wherein said means for exciting the electromagnet comprises a ramp signal generator and said means for measuring the magnetic field is a Hall effect device which provides a signal proportional to the field of the electromagnet.

6. The system of claim 1 wherein said means for sensing comprises a Hall effect device and a permanent magnet, one of said device and said permanent magnet being movable with said load bearing member.

7. The system of claim 6 wherein said means for changing said generated signal into a second signal comprises a squaring circuit and a summing circuit.

8. The system of claim 1 further including means for changing said indicative signal into another signal linearly proportional to the weight of an object on said load bearing member.

9. In a system for weighing a test object of the type where an electromagnet is excited to move a load bearing member toward a zero position, the improvement comprising:
means for exciting the electromagnet at a finely increasing rate;
means for measuring the magnetic field of said electromagnet acting to return the load bering and generating a signal which is proportional thereto;
means for sensing when said load bearing member moves under the force of the magnetic field;
means for changing said generated signal into a second signa linearly proportional to the weight of said object;
means responsive to said sensing means for sampling the second signal; and
means responsive to said sampling means for displaying an indication of the weight of the load.

10. The system of claim 7 wherein said means for sensing comprises a Hall effect device and a permanent magnet, one of said device and said permanent magnet being movable with said load bearing member.

* * * * *

UNITED STATES PATENT AND TRADEMARK OFFICE
CERTIFICATE OF CORRECTION

PATENT NO. : 4,336,854
DATED : June 29, 1982
INVENTOR(S) : William F. Jensen

It is certified that error appears in the above-identified patent and that said Letters Patent are hereby corrected as shown below:

Column 1, Line 43, correct the spelling of "caracteristics"

to read -- characteristics --

Column 6, Claim 9, Line 33: add -- l -- to word "signa"

to make word read -- signal --.

Signed and Sealed this

Seventh Day of September 1982

[SEAL]

Attest:

GERALD J. MOSSINGHOFF

Attesting Officer

Commissioner of Patents and Trademarks